(12) United States Patent
Osaka (10) Patent No.: US 7,696,733 B2
(45) Date of Patent: Apr. 13, 2010

(54) RESONANT SWITCHING POWER SOURCE DEVICE

(75) Inventor: Shohei Osaka, Saitama (JP)

(73) Assignee: Sanken Electric Co., Ltd. (JP)

( * ) Notice: Subject to any disclaimer, the term of this patent is extended or adjusted under 35 U.S.C. 154(b) by 191 days.

(21) Appl. No.: 11/774,634

(22) Filed: Jul. 9, 2007

(65) Prior Publication Data

US 2008/0049453 A1 Feb. 28, 2008

(30) Foreign Application Priority Data

Jul. 11, 2006 (JP) .............................. 2006-190451

(51) Int. Cl.
*G05F 1/577* (2006.01)
*H02M 3/335* (2006.01)

(52) U.S. Cl. ........................ 323/267; 363/21.02; 307/17

(58) Field of Classification Search .................. 363/16, 363/17, 21.02, 65, 67, 69, 79, 125; 323/267, 323/268; 307/17, 31, 33, 34
See application file for complete search history.

(56) References Cited

U.S. PATENT DOCUMENTS

| | | | | |
|---|---|---|---|---|
| 4,825,348 | A * | 4/1989 | Steigerwald et al. | 363/17 |
| 5,946,206 | A * | 8/1999 | Shimizu et al. | 363/65 |
| 7,009,853 | B2 * | 3/2006 | Nagel et al. | 363/17 |
| 7,304,867 | B2 * | 12/2007 | Usui | 363/21.06 |
| 7,362,596 | B2 * | 4/2008 | Gjerde et al. | 363/69 |
| 7,423,892 | B2 * | 9/2008 | Vinciarelli | 363/65 |

2006/0077600 A1 4/2006 Yasumura

FOREIGN PATENT DOCUMENTS

| | | |
|---|---|---|
| JP | 3007062 | 1/1991 |
| JP | 2799760 | 9/1998 |
| JP | 2000217356 | 8/2000 |
| KR | 20060051715 | 5/2006 |

OTHER PUBLICATIONS

Translation of Korean Office Action for KR10-2007-0069104, dated Dec. 16, 2008.

* cited by examiner

*Primary Examiner*—Gary L Laxton
(74) *Attorney, Agent, or Firm*—Bachman & LaPointe, P.C.

(57) ABSTRACT

A resonant switching power source device is provided which comprises first and second MOS-FETs 1 and 2 connected in series to a DC power source 3, a first transformer 5 which has a first primary winding 5a connected in parallel to first or second MOS-FET 1 or 2 and in series to a first capacitor 4, a first rectifying smoother 10 connected between a secondary winding 5b of first transformer 5 and first output terminals 11, 12, a second transformer 6 which has a primary winding 6a connected in parallel to primary winding 5a of first transformer 5, and a second rectifying smoother 20 and an output-regulatory MOS-FET 41 connected between a secondary winding 6b in second transformer 6 and second DC output terminals 21 and 22 to control peak current flowing through primary windings of transformers 5 and 6 and rectifying smoothers 10 and 20 in secondary sides for improvement in power conversion efficiency and to produce stable DC outputs of desired level from a plurality of output terminals 11, 12, 21 and 22.

6 Claims, 5 Drawing Sheets

RESONANT SWITCHING POWER SOURCE DEVICE

TECHNICAL FIELD

This invention relates to a resonant switching power source device for generating a plurality of DC outputs, in particular of the type capable of reducing an amount of electric current flowing through a primary side of a transformer, while restraining a peak electric current flowing through each rectifying smoother in a secondary side to improve the power conversion efficiency, and also independently producing DC voltage outputs of desired level from a plurality of output terminals.

BACKGROUND OF THE INVENTION

Prior art current resonant switching power source devices are widely known as having their high power conversion efficiency with low noise and reduced switching loss because a resonance circuit therein converts electric current flowing through switching elements into a sinusoidal wave form for zero current switching (ZCS) when the switching elements are turned on or off. For example, a prior art resonant switching power source device shown in FIG. 6 comprises first and second main MOS-FETs 1 and 2 as first and second switching elements connected in series to a DC power source 3, a series circuit which includes a current resonance capacitor 4, a leakage inductance 5d and a primary winding 5a of a transformer 5 connected in parallel to second main MOS-FET 2, a voltage pseudo resonance capacitor 7 connected between drain and source terminals of second main MOS-FET 2, a first output rectifying diode 8 which has an anode terminal connected to one end of first secondary winding 5b of transformer 5, a first output smoothing capacitor 9 connected between a cathode terminal of first output smoothing capacitor 8 and the other end of first secondary winding 5b, a second output rectifying diode 18 which has an anode terminal connected to one end of second secondary winding 5c of transformer 5, a second output smoothing capacitor 19 connected between cathode terminal of second output rectifying diode 18 and the other end of second secondary winding 5c, and a step down chopper 27 connected to second output smoothing capacitor 19. First output rectifying diode 8 and first output smoothing capacitor 9 are incorporated together to form a first rectifying smoother 10 which produces a first DC output voltage $V_{O1}$ through first DC output terminals 11 and 12. Second output rectifying diode 18 and second output smoothing capacitor 19 are incorporated together to form a second rectifying smoother 20 which produces second DC output voltage $V_{O2}$ through step down chopper 27 from second DC output terminals 21 and 22.

Figure 6:
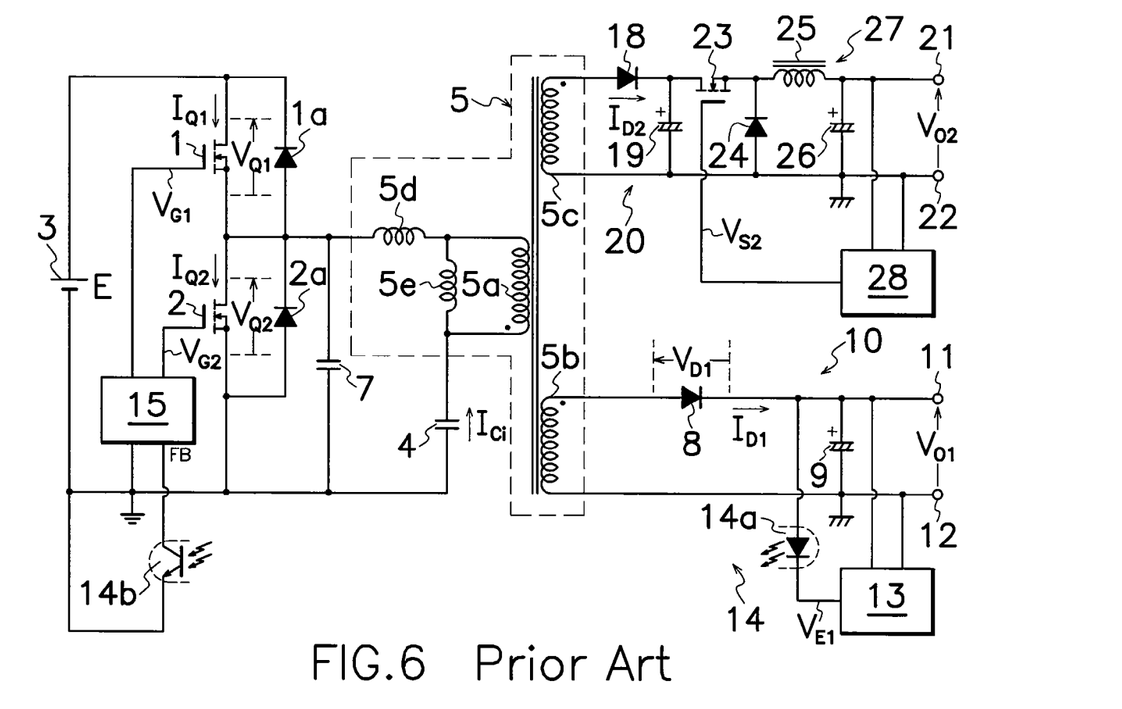
FIG. 6 is an electric circuit diagram showing a prior art resonant switching power source device.

Transformer 5 comprises a leakage inductance 5d acting as a current resonance reactor connected equivalently in series to primary winding 6a, and an excitation inductance 5e connected equivalently in parallel to primary winding 6a. Connected to both ends of first output smoothing capacitor 9 in first rectifying smoother 10 is a first output voltage detector 13 for detecting first DC output voltage $V_{O1}$ issued from first rectifying smoother 10 to produce an error signal $V_{E1}$, the differential between detected first DC output voltage $V_{O1}$ and a reference voltage for prescribing the detected output voltage $V_{O1}$, and error signal $V_{E1}$ is transmitted to a feedback signal input terminal FB of main control circuit 15 through a photo-coupler 14 of a light emitter 14a and a light receiver 14b.

Step down chopper 27 comprises a chopping MOS-FET 23 which has a drain terminal connected to a junction of second output rectifying diode 18 and second output smoothing capacitor 19 in second rectifying smoother 20, a flywheel diode 24 connected between a source terminal of chopping MOS-FET 23 and ground terminal 22 in secondary side, a filter reactor 25 which has one end connected to a junction between source terminal of chopping MOS-FET 23 and cathode terminal of flywheel diode 24, and a filter capacitor 26 connected between the other end of filter reactor 25 and ground terminal 22 in secondary side. A chopper controller 28 has a built-in power supply for producing reference voltage to prescribe a value of second output voltage, and produces a PWM signal $V_{S2}$ of modulated pulse width based on an error signal, the differential between output voltage $V_{O2}$ on filter capacitor 26 and the reference voltage. Thus, step down chopper 27 controls the on-off operation of chopping MOS-FET 23 by PWM signal $V_{S2}$ from chopper controller 28 to produce, from second DC output terminals 21 and 22, second DC output $V_{O2}$ of a constant level lower than DC voltage input into step down chopper 27 from second output smoothing capacitor 19 in second rectifying smoother 20.

Figure 7:
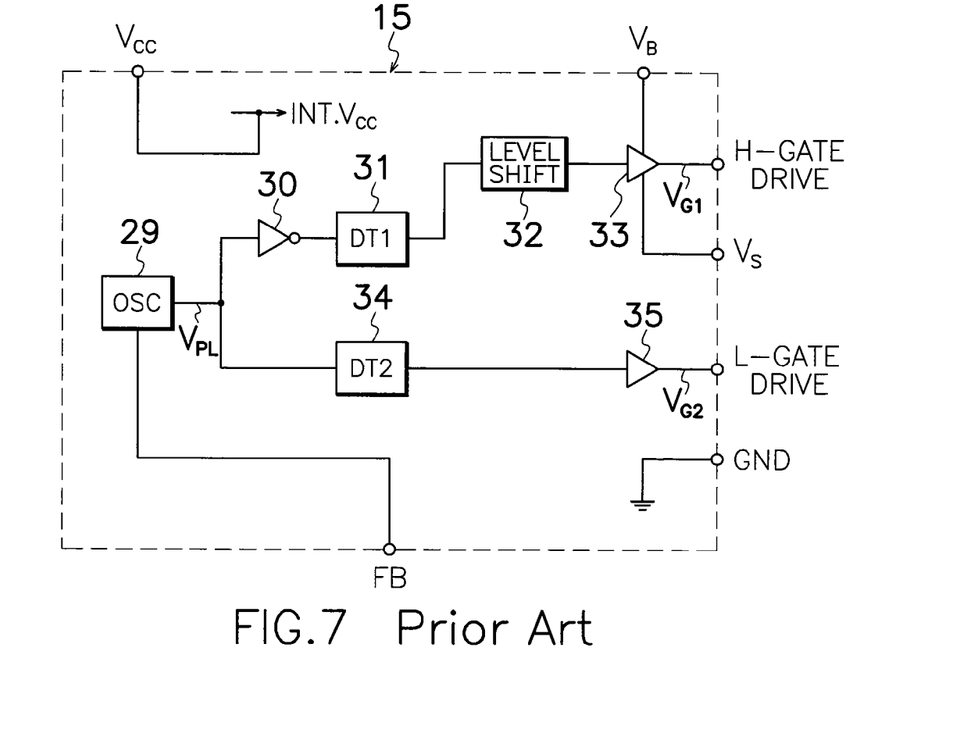
FIG. 7 is an electric circuit diagram of an inner configuration of a main control circuit.

As shown in FIG. 7, main control circuit 15 comprises an oscillator 29 for producing pulse signals $V_{PL}$ of frequency variable in response to voltage level of error signal $V_{E1}$ transmitted from first output voltage detector 13 into feedback signal input terminal FB through photo-coupler 14 of light emitter 14a and light receiver 14b, an inverter 30 for producing an inverted signal of a pulse signal $V_{PL}$ from oscillator 29, a first dead time adder 31 for incorporating a constant dead time in inverted signal $V_{PL}$ from oscillator 29 through inverter 30 to produce a first drive signal $V_{G1}$, a level shift circuit 32 for shifting voltage level of first drive signal $V_{G1}$ inclusive of added dead time, a high side buffer amplifier 33 for applying first drive signal $V_{G1}$ from level shift circuit 32 to a gate terminal of first main MOS-FET 1, a second dead time adder 34 for incorporating a constant dead time in a pulse signal $V_{PL}$ from oscillator 29 to produce a second drive signal $V_{G2}$, and a low side buffer amplifier 35 for applying second drive signal $V_{G2}$ inclusive of dead time to a gate terminal of second main MOS-FET 2. Pulse signal $V_{PL}$ has the varied frequency and a constant pulse width, and first drive signal $V_{G1}$ has a fixed off-period and an on-period varied in response to voltage level of error signal $V_{E1}$ from output voltage detector 13. Second drive signal $V_{G2}$ has a fixed on-period and an off-period varied in response to voltage level of error signal $V_{E1}$ from output voltage detector 13, and therefore, main control circuit 15 produces first and second drive signals $V_{G1}$ and $V_{G2}$ to gate terminal of respectively first and second main MOS-FETs 1 and 2. In this way, first and second main MOS-FETs 1 and 2 are alternately turned on and off in response to voltage level of error signal $V_{E1}$ from first output voltage detector 13.

Figure 8:
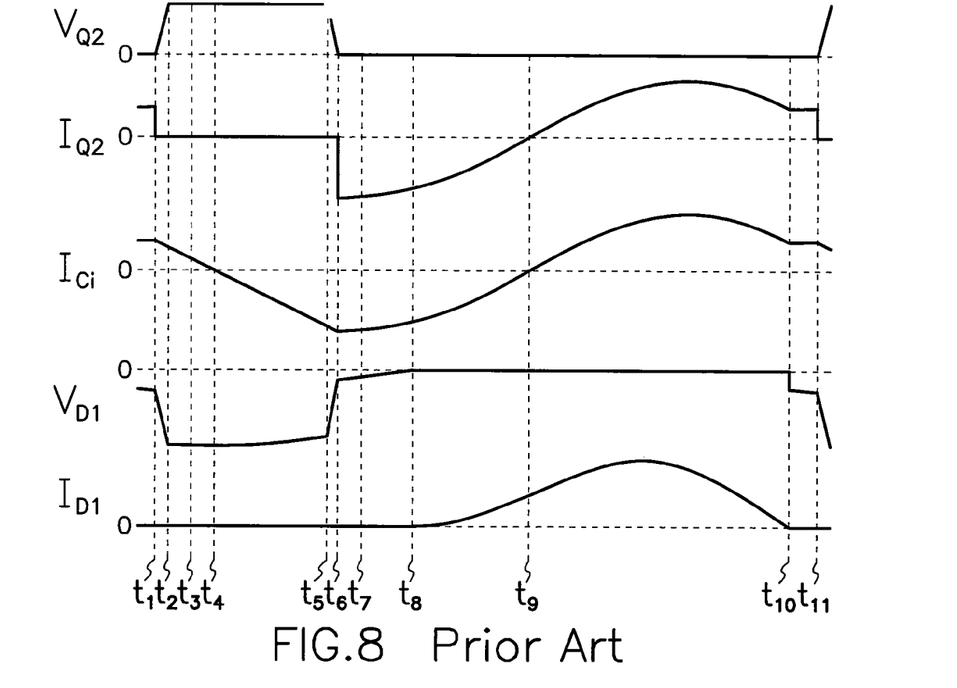
FIG. 8 is wave form charts of voltages and electric currents during operation at selected locations in the electric circuit shown in FIG. 6.

Referring now to FIG. 8 showing time charts of voltages and electric currents at selected locations in FIG. 6, and the operation of the resonant switching power source device of FIG. 6 is described hereinafter. When second main MOS-FET 2 is turned from on to off at a point $t_1$ in time under the off-condition of first main MOS-FET 1, electric current $I_{Ci}$ flows from leakage and excitation inductances 5d and 5e of transformer 5 through voltage pseudo resonance capacitor 7, current resonance capacitor 4 to excitation inductance 5e of transformer 5 while releasing energy accumulated in leakage and excitation inductances 5d and 5e of transformer 5. This causes electric charge in voltage pseudo resonance capacitor 7 to drop voltage $V_{Q1}$ between drain and source terminals of first main MOS-FET 1 and adversely raise voltage $V_{Q2}$ between drain and source terminals of second main MOS-FET 2.

When charged voltage in voltage pseudo resonance capacitor 7 comes up to voltage E at a point $t_2$ in time under the off-condition of both first and second main MOS-FETs 1 and 2, voltage $V_{Q1}$ between drain and source terminals of first main MOS-FET 1 becomes substantially zero and at the same time voltage $V_{Q2}$ between drain and source terminals of second main MOS-FET 2 becomes substantially equal to voltage E of DC power source 3. During the period of time between points $t_2$ and $t_3$, electric current $I_{Ci}$ flows from excitation inductance 5e and leakage inductance 5d of transformer 5 through a parasitic diode 1a of first main MOS-FET 1, DC power source 3 and current resonance capacitor 4 to excitation inductance 5e to electrically charge current resonance capacitor 4.

When first main MOS-FET 1 is turned on at point $t_3$ in time under the off-condition of second main MOS-FET 2, electric current $I_{Ci}$ decreasingly flows from leakage inductance 5d of transformer 5 through first main MOS-FET 1, DC power source 3, current resonance capacitor 4 and excitation inductance 5e of transformer 5. Upon completion of energy release from leakage and excitation inductances 5d and 5e of transformer 5 at point $t_4$ in time, electric current $I_{Ci}$ flowing through current resonance capacitor 4 becomes substantially zero.

When electric current $I_{Ci}$ through current resonance capacitor 4 has become nearly zero at point $t_4$, charging current $I_{Ci}$ for current resonance capacitor 4 starts flowing from DC power source 3 through first main MOS-FET 1, leakage and excitation inductances 5d and 5e of transformer 5, current resonance capacitor 4 to DC power source 3. In other words, during the period from point $t_4$ to $t_5$, electric current $I_{Ci}$ flows through current resonance capacitor 4 in the adverse direction from that during the period from points $t_1$ to $t_4$ to reset magnetic flux produced in primary winding 6a of transformer 5.

When first main MOS-FET 1 is turned from on to off at point $t_5$ under the off-condition of second main MOS-FET 2, electric current flows from current resonance capacitor 4 through voltage pseudo resonance capacitor 7, leakage and excitation inductances 5d and 5e of transformer 5 to current resonance capacitor 4 to discharge voltage pseudo resonance capacitor 7, while elevating voltage $V_{Q1}$ between drain and source terminals of first main MOS-FET 1, and decreasing voltage $V_{Q2}$ between drain and source terminals of second main MOS-FET 2.

When electric discharge from voltage pseudo resonance capacitor 7 is completed at point $t_6$ under the off-condition of both first and second main MOS-FETs 1 and 2, voltage $V_{Q2}$ between drain and source terminals of second main MOS-FET 2 comes to approximately zero, and at the same time, voltage $V_{Q1}$ between drain and source terminals of first main MOS-FET 1 becomes equal to power voltage E. At this time, electric current $I_{Ci}$ flows from excitation inductance 5e of transformer 5 through current resonance capacitor 4, parasitic diode 2a of second main MOS-FET 2 and leakage inductance 5d to excitation inductance 5e.

When second main MOS-FET 2 is turned on at point $t_7$ under the off-condition of first main MOS-FET 1, electric current flows from excitation inductance 5e of transformer 5 through current resonance capacitor 4, second main MOS-FET 2 to leakage inductance 5d of transformer 5.

At point $t_8$, energy is transmitted from primary to secondary side of transformer 5, and a positive voltage appears on upper end of first secondary winding 5b of transformer 5. At this time, first output rectifying diode 8 of first rectifying smoother 10 is biased in the forward direction into the conductive condition, and therefore, voltage $V_{D1}$ across first output rectifying diode 8 becomes approximately zero. Concurrently, due to resonance action by leakage and excitation inductances 5d and 5e and current resonance capacitor 4, circulation current branches from a path inclusive of excitation inductance 5e of transformer 5, current resonance capacitor 4, second main MOS-FET 2 and leakage inductance 5d of transformer 5 and flows through primary winding 6a of transformer 5. Also, due to resonance action by leakage inductance 5d of transformer 5 and current resonance capacitor 4, resonance current flows through primary winding 6a of transformer 5 along a path of primary winding 6a of transformer 5, current resonance capacitor 4, second main MOS-FET 2 and leakage inductance 5d of transformer 5. As a result, superimposed two circulation and resonance currents flow through primary winding 6a of transformer 5. Accordingly, sine wave-like load current $I_{D1}$ starts flowing from first secondary winding 5b of transformer 5 through first output rectifying diode 8 while load current $I_{D1}$ has the substantially same frequency as resonance frequency determined by leakage inductance 5d of transformer 5 and capacitance of current resonance capacitor 4.

When electric current $I_{Ci}$ through current resonance capacitor 4 becomes nearly zero at point $t_9$, circulation current flows from excitation and leakage inductances 5e and 5d of transformer 5 through second main MOS-FET 2 and current resonance capacitor 4, and at the same time, resonance current flows through primary winding 6a and current resonance capacitor 4 due to resonance action by leakage inductance 5d of transformer 5 and current resonance capacitor 4. Accordingly, superimposed circulation and resonance currents flow through current resonance capacitor 4 to discharge it. At this time, sine wave-like load current $I_{D1}$ keeps flowing through first output rectifying diode 8 in secondary side until it comes to zero at point $t_{10}$. During the period of time from point $t_8$ to $t_{10}$, voltage appearing on first secondary winding 5b of transformer 5 causes electric current to flow through first output rectifying diode 8 and first output smoothing capacitor 9 for commutation and smoothing to produce first DC output voltage $V_{O1}$ at first DC output terminals 11 and 12.

At point $t_{10}$ in time, circulation current flows from excitation inductance 5e of transformer 5 through leakage inductance 5d, second main MOS-FET 2 and current resonance capacitor 4 to accumulate energy in leakage and excitation inductances 5d and 5e of transformer 5. At the moment, voltage on first secondary winding 5b of transformer 5 is equal to or lower than first DC output voltage $V_{O1}$ and inversely biasing voltage $V_{D1}$ is applied on first output rectifying diode 8 which therefore is turned off into a non-conductive condition to stop electric current $I_{D1}$ through first output rectifying diode 8. At time $t_{11}$ after a cycle of first drive signal $V_{G1}$ from main control circuit 15 has elapsed, second main MOS-FET 2 is turned from on to off while retaining first main MOS-FET 1 off, and from then on, the foregoing operations are repeated.

First output voltage detector 13 detects first DC output voltage $V_{O1}$ on first DC output terminals 11 and 12 to produce error signal $V_{E1}$, the difference between the detected voltage by detector 13 and reference voltage for prescribing first DC output voltage value $V_{O1}$, and then error signal $V_{E1}$ is transmitted to feedback signal input terminal FB of main control circuit 15 through photo-coupler 14 of light emitter 14a and light receiver 14b. Main control circuit 15 prepares first and second drive signals $V_{G1}$ and $V_{G2}$ of pulse frequency modulated based on voltage level of error signal $V_{E1}$ forwarded from first output voltage detector 13 to feedback signal input terminal FB, and supplies first and second drive signals $V_{G1}$ and $V_{G2}$ to each gate terminal of first and second main MOS- FETs 1 and 2 to alternately turn them on and off with the frequency corresponding to voltage level of error signal $V_{E1}$ from first output voltage detector 13, and thereby control toward and at a consistent value of first DC output voltage $V_{O1}$ generated from first DC output terminals 11 and 12.

On-off operation of first and second main MOS-FETs 1 and 2 induces voltage on second secondary winding 5c of transformer 5 and also on second rectifying smoother 20. At this time, produced between both ends of second output smoothing capacitor 19 is DC voltage of the level accordant to turn ratio of first and second secondary windings 5b and 5c of transformer 5. DC voltage appearing between both ends of second output smoothing capacitor 19 is applied to step down chopper 27. Chopper controller 28 compares voltage $V_{O2}$ between both ends of filter capacitor 26 with reference voltage for prescribing second output voltage value to produce a pulse-width modulated (PWM) signal $V_{S2}$ based on an error signal, the difference between voltage $V_{O2}$ and reference voltage. Step down chopper 27 controls the on-off operation of chopping MOS-FET 23 depending on PWM signal $V_{S2}$ from chopper controller 28 to generate from second DC output terminals 21 and 22 second DC output voltage $V_{O2}$ of a constant level lower than that of DC voltage applied to second output smoothing capacitor 19.

General switching power source devices of flyback or forward multi-output type are designed to control the DC output generated in secondary side by changing the on and off duty-ratio of main switching elements in primary side, and therefore, they are disadvantageous in changing period for transmitting electric power from primary to secondary side. Therefore, the above-mentioned duty ratio determined by DC voltage taken from one of secondary windings restricts electric power taken from the other of secondary windings so that output voltage from the other secondary winding is inconveniently reduced. On the contrary, resonant switching power source device of multi-output type can determine the period for supplying electric power from primary to secondary side of transformer 5 by resonance frequency given by current resonance capacitor 4 and leakage inductance 5d of transformer 5 in primary side, and therefore, almost no change arises in the period for supplying electric power from primary to secondary side of transformer 5 even though load connected to first DC output terminals 11 and 12 fluctuates. Consequently, whether load is big or small, the resonant switching power source device can produce electric power of necessary level from second secondary winding 5c of transformer 5 without drop in output voltage from second rectifying smoother 20. However, second rectifying smoother 20 may produce fluctuating output voltage because actually transformer 5 does not have an ideal electromagnetic coupling and/or due to impact on the output voltage by fluctuation in input voltage E or voltage drop in first rectifying smoother 10. For that reason, prior art resonant switching power source device shown in FIG. 6 employs step down chopper 27 to stabilize DC voltage from second rectifying smoother 20 and produce steady second DC output voltage $V_{O2}$ from second DC output terminals 21 and 22. Specifically, step down chopper 27 at the subsequent stage of second rectifying smoother 20 can provide a resonant switching power source device of multi-output type capable of performing an ideal cross-regulation. The term "cross-regulation" means a fluctuation in output voltage produced under changing load or loads of other output in a prescribed range in a switching power source device of multi-output type.

Japanese Patent Disclosure No. 3-7062 demonstrates a resonant switching power source device which comprises a frequency modulator for modulating reference pulse signals in frequency into pulse array signals, a power transistor turned on and off by pulse array signals to control voltage applied on a primary winding of transformer, and a rectifying smoother provided in each of plural secondary windings for rectifying and smoothing an output from each secondary winding to output terminals. This power source device comprises a comparator as a primary control means for controlling frequency of pulse array signals produced from a frequency modulator in response to given output signals from rectifying smoother in secondary side. Also, a secondary control circuit is provided to turn a switching transistor on and off in response to given output signals from the secondary winding through a rectifying smoother in order to control the duty-cycle of pulse array voltages produced at the output side of switching transistor. This may thin an appropriate amount of pulse array voltages produced at the output side of switching transistor to adjust DC output voltage from secondary winding through rectifying smoother at a desired level.

Also, Japanese Patent Disclosure No. 2000-217356 shows a DC-DC converter of multi-output type which comprises a transformer having a primary winding and two secondary windings for power conversion, a field effect transistor connected to the primary winding of transformer of performing switching operation, a first voltage detector for detecting output voltage after stabilization of output from first secondary winding of transformer, a first pulse width modulator for comparing detection signal from first voltage detector with reference voltage to control pulse width of pulse control signals supplied to field effect transistor, a switch circuit connected to one end of second secondary winding of transformer, a second voltage detector for detecting rectified and smoothed output voltage from second secondary winding, a second pulse width modulator for comparing detected signals from second voltage detector with a reference voltage to modulate pulse width of pulse signals forwarded to switch circuit, and a synchronization circuit for synchronizing output from second pulse width modulator with output from first pulse width modulator. This DC-DC converter may control the on-time of switch circuit in secondary output line according to output voltage except the main feedback output to reduce power loss and stabilize output voltage even under large load fluctuation in the main feedback output.

Prior art resonant switching power source device shown in FIG. 6 may transmit energy to secondary side of transformer 5 by means of electric current $I_{Ci}$ formed by merged and superimposed resonance current on circulation current flowing through primary winding 6a of transformer 5. In this case, as half-wave rectification is performed through first rectifying diode 8 in secondary side of transformer 5, resonance current joined into circulation current increases with increase in energy transmitted to secondary side. Since the only AC component of resonance current flows through primary winding 5a of transformer 5, resonance current of average value being approximately zero flows through primary winding 5a of transformer 5. In other words, positive and negative half cycles of this resonance current indicate substantially the same temporal area each other. Main control circuit 15 performs the on-off operation of first and second main MOS-FETs 1 and 2 while diverting electric current to parasitic diodes 1a and 2a of each main MOS-FET 1, 2 to control and alleviate fluctuation in voltage between drain and source terminals of main MOS-FETs 1 and 2 under the voltage pseudo condition. To transmit maximum energy to secondary side of transformer 5, while still retaining the voltage pseudo resonance condition, the time area of circulation current has to be substantially equal to the time area of resonance current flowing through primary winding 5a of transformer 5. Accordingly, to transmit more amount of energy to secondary side of transformer 5, more amount of circulation current has to flow through primary winding 6a of transformer 5. This results in increase in electric current flowing through primary winding 5a of transformer 5 and augmentation in self-heating by more amount of circulation current together with a large power conversion loss and a lowered power conversion efficiency.

Figure 9:
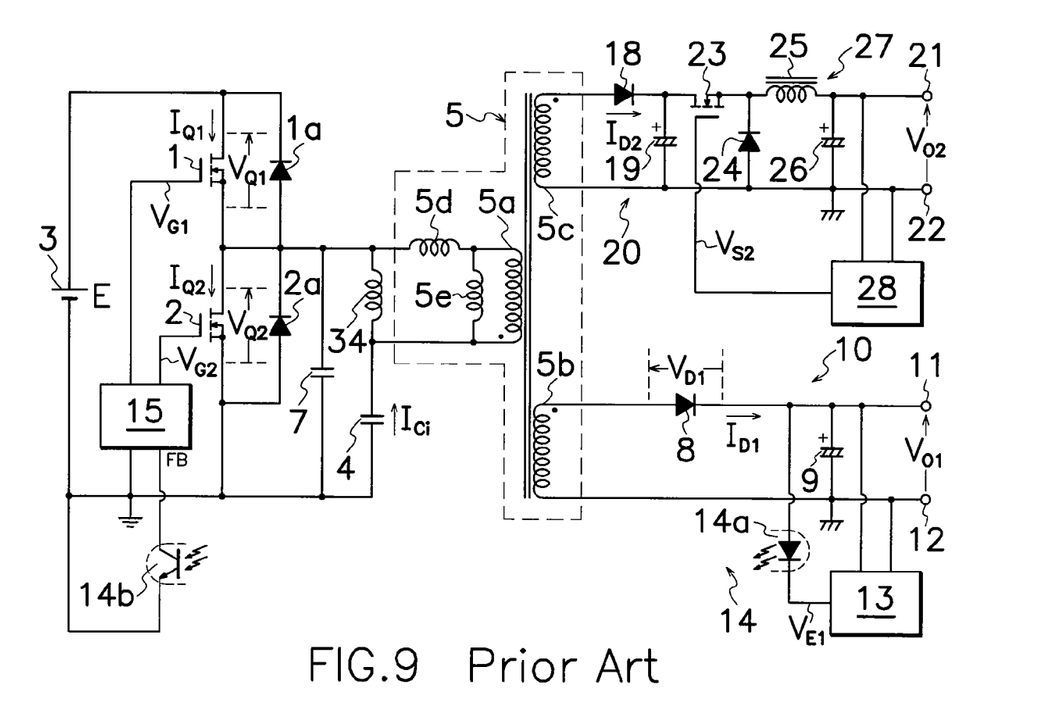
FIG. 9 is an electric circuit diagram showing a varied sample of a prior art resonant switching power source device.

To solve the foregoing problems, for example, a resonant switching power source device shown in FIG. 9, comprises an excitation reactor 34 connected in parallel to leakage and excitation inductances 5d and 5e of transformer 5, and excitation reactor 34 has an inductance value smaller than that of excitation inductance 5e of transformer 5 shown in FIG. 6. This circuitry allows a major amount of circulation current flowing in primary side of transformer 5 to divert through excitation reactor 34 to control effective value of electric current running through primary winding 5a of transformer 5. However, the power source device shown in FIG. 9 undesirably incorporates excitation reactor 34 which leads to increase in number of electric components and rise in cost for manufacture.

Also, the power source devices shown in the above-mentioned references comprise a switching element connected in any secondary line of transformer to adjust DC output voltage by the on-off operation of the switching element, and therefore, it has a drawback of current convergence in a specific output line upon turning-on of the switching element while disadvantageously providing a period of time of no current flow through other output lines than the specific output line. Especially, switching power source devices of boost type, which require higher output voltages, induce high voltages on secondary windings of transformer which result in rapid electric charge into output smoothing capacitors for very short charging time with large charging current. Inconveniently, this gives rise to a peak current appearing during the charging period of output smoothing capacitor, and peak current invites current concentration upon turning-on of secondary switching element with increase in power conversion loss and degradation in power conversion efficiency. Moreover, the foregoing current convergence causes uneven DC output voltages to develop from plural output terminals so that it makes difficult to separately generate steady DC output voltages of desired level from plural output terminals.

Therefore, an object of the present invention is to provide a resonant switching power source device which may reduce electric current flowing through a primary winding of a transformer. Another object of the present invention is to provide a resonant switching power source device which may control peak current flowing through each rectifying smoother in the secondary side for improvement in power conversion efficiency. Still another object of the present invention is to provide a resonant switching power source device which may independently generate stable DC output voltages of desired level from plural output terminals.

SUMMARY OF THE INVENTION

The resonant switching power source device according to the present invention comprises first and second switching elements (1, 2) connected in series to a DC power source (3), a first transformer (5) which has a first primary winding (6a) connected in parallel to first or second switching element (1 or 2) and in series to a first capacitor (4), a first rectifying smoother (10) connected between a secondary winding (5b) of first transformer (5) and first output terminals (11, 12), an additional $n^{th}$ transformer (6) which has a single additional primary winding or n additional primary windings (6a) connected in parallel to first or second switching element (1 or 2) and in series to first capacitor (4), where the n is an integer equal to or more than 2, an $n^{th}$ rectifying smoother (20) connected between an additional secondary winding (6b) of additional $n^{th}$ transformer (6) and $n^{th}$ output terminals (21, 22), and a control circuit (15) for forwarding drive signals ($V_{G1}$, $V_{G2}$) to and turning first and second switching elements (1, 2) on and off. Primary winding (6a) of first transformer (5) comprises a first leakage inductance element (5d) connected in series to first capacitor (4) and primary winding (6a) of first transformer (5), and primary winding (6a) of additional $n^{th}$ transformer (6) comprises an additional $n^{th}$ leakage inductance element (6d).

When first switching element (1) is turned on with drive signals ($V_{G1}$) from control circuit (16), circulation current flows from DC power source (3) through first switching element (1), primary winding (6a) of transformer (5) and first capacitor (4) to DC power source (3), and at the same time, resonance current flows from DC power source (3) through first switching element (1), primary winding (6a) of additional $n^{th}$ transformer (6) and first capacitor (4) to DC power source (3) to accumulate energy in first transformer (5). Then, when first switching element (1) is turned off and second switching element (2) is turned on, energy accumulated in first transformer (5) causes resonance current to flow from primary winding (6a) of first transformer (5) through second switching element (2) and first capacitor (4), and coincidentally, electric current flows from primary winding (6a) of $n^{th}$ additional transformer (6) through second switching element (2) and first capacitor (4) to accumulate energy in $n^{th}$ additional transformer (6). Also, synchronously with turning-on of first or second switching element (1 or 2), electric current flows from secondary winding (5b) of first transformer (5) through first rectifying smoother (10) and first output terminals (11, 12) to supply electric current to first load, and concurrently, electric current flows from secondary winding (6b) of $n^{th}$ additional transformer (6) through $n^{th}$ rectifying smoother (20) and $n^{th}$ output terminals (21, 22) to supply electric current to $n^{th}$ load. Thus, as the switching power source device concurrently comprises first primary winding (6a) of first transformer (5) connected in parallel to first or second switching element (1, 2) and in series to first capacitor (4), and $n^{th}$ primary winding (6a) of a single or plural $n^{th}$ transformers (6), a composite inductance is formed by from first primary winding (6a) of first transformer (5) to $n^{th}$ primary winding (6a) of $n^{th}$ additional transformer 6. This ensures that circulation current arises due to resonance action by composite inductance of from first primary winding (6a) of first transformer (5) to $n^{th}$ primary winding (6a) of $n^{th}$ additional transformer (6) and first capacitor (4) upon turning on-off of first or second switching element (1 or 2), and circulation current branches into each primary winding (6a to 6a) of first to $n^{th}$ transformers (5 to 6). This serves to reduce effective value of electric current flowing through each primary winding (6a to 6a) of first to $n^{th}$ transformers (5 to 6) while restraining heating of each transformer (5 to 6) and improving power conversion efficiency. Also, each primary winding (6a to 6a) of first to $n^{th}$ transformers (5 to 6) comprises first capacitor (4) commonly connected to primary windings (6a to 6a) and first to $n^{th}$ leakage inductances (5d to 6d) connected in series to each primary winding (6a to 6a) of first to $n^{th}$ transformers (5 to 6) to independently operate first to $n^{th}$ transformers (5 to 6) and also cause first to $n^{th}$ output currents ($I_{D1}$ to $I_{Dn}$) to independently flow through each secondary winding (5b to 6b) of first to $n^{th}$ transformers (5 to 6) while avoiding current concentration in any one of first to $n^{th}$ output terminals (11, 12 to 21, 22). This ensures stable and independent DC output voltages of desirable level from first to $n^{th}$ output terminals (11, 12 to 21, 22) to restrain peak current flowing through first to $n^{th}$ rectifying smoothers (10 to 20) for suppression of power conversion loss and improvement in power conversion efficiency. Accordingly, this can prevent generation of uneven output voltages from plural output terminals in prior art resonant switching power source device which produces DC output voltages from plural output terminals making common use of a single transformer.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Embodiments of the resonant switching power source device according to the present invention will be described hereinafter in connection with FIGS. 1 to 5 of the drawings. Same reference symbols as those shown in FIGS. 6 to 9 are applied to similar portions in FIGS. 1 to 5, omitting explanation therefor.

Figure 1:
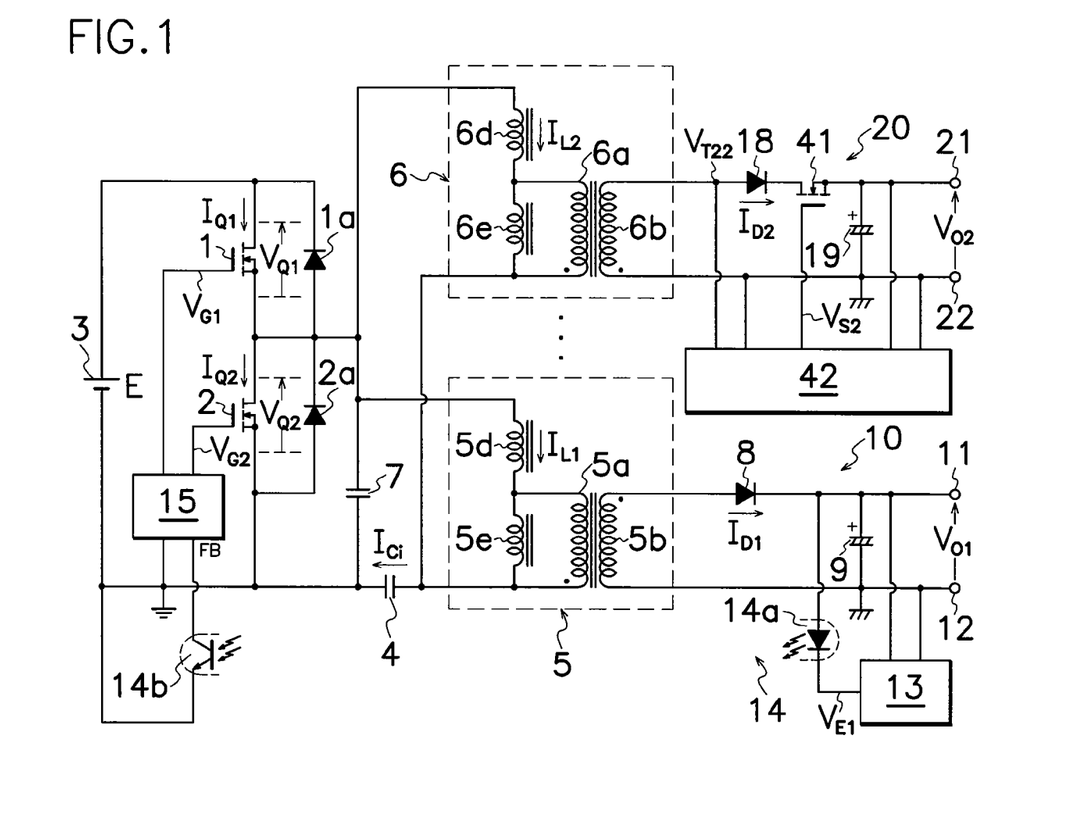
FIG. 1 is an electric circuit diagram showing a first embodiment of the resonant switching power source device according to the present invention.

As shown in FIG. 1, the resonant switching power source device of a first embodiment according to the present invention, comprises first and second main MOS-FETs 1 and 2 as first and second switching elements connected in series to a DC power source 3, a first transformer 5 which has a first primary winding 6a connected in parallel to second switching element 2 and in series to a current resonance capacitor 4 as a first capacitor 4, a first rectifying smoother 10 which has a first output rectifying diode 8 and a first output smoothing capacitor 9 connected between a secondary winding 5b of first transformer 5 and first output terminals 11 and 12, an additional or second transformer 6 which has a primary winding 6a connected in parallel to second switching element 2 and in series to first capacitor 4, a voltage pseudo resonance capacitor 7 connected in parallel to second main MOS-FET 2, a second rectifying smoother 20 which comprises a second output rectifying diode 18 and a second output smoothing capacitor 19 connected between second winding 6b of second transformer 6 and second DC output terminals 21 and 22, and a control circuit 15 for forwarding drive signals $V_{G1}$ and $V_{G2}$ to each gate terminal of first and second MOS-FETs 1 and 2 to turn them on and off. First and second transformers 5 and 6 have respectively first and second leakage inductances $5d$ and $6d$ as first and second leakage inductance elements connected equivalently and in series to each primary winding $5a$, $6a$, and first and second excitation inductances $5e$ and $6e$ connected equivalently to each primary winding $6a$, $6a$. First and second leakage inductances $5d$ and $6d$ act as current resonance reactors. First capacitor 4 and voltage pseudo resonance capacitor 7 are commonly connected to first leakage and excitation inductances $5d$ and $5e$ and second leakage and excitation inductances $6d$ and $6e$. Connected between second output rectifying diode 18 and second output capacitor 19 in second rectifying smoother 20 is an output-regulatory MOS-FET 41 which is turned on and off by output control circuit 42 in synchronization with the on-period and the same switching frequency of first main MOS-FET 1. Also, main control circuit 15 controls the on-duty of second main MOS-FET 2 under the fixed on-period of second main MOS-FET 2 with the varied on-period of first main MOS-FET 1 in response to the level of first DC output voltage $V_{O1}$ from first rectifying smoother 10.

Figure 2:
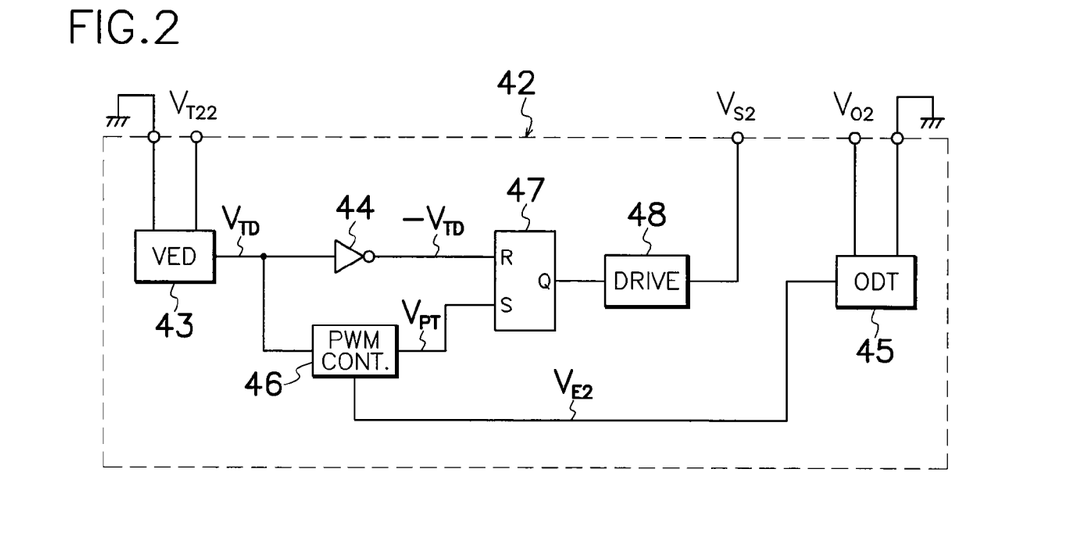
FIG. 2 is an electric circuit diagram showing an inner configuration of an output control circuit.

As shown in FIG. 2, output control circuit 42 comprises a voltage change detector 43 for detecting rising and dropping edges of voltage $V_{T22}$ produced in secondary winding $6b$ of second transformer 6 at the time of turning-on and off of second main MOF-FET 2 to generate a detection signal $V_{TD}$, an inverter 44 for producing an inverted signal $-V_{TD}$ of detection signal $V_{TD}$ from voltage change detector 43, a second output voltage detector 45 for detecting voltage $V_{O2}$ on second output smoothing capacitor 19 to produce an error signal $V_{E2}$, the difference between detected voltage $V_{O2}$ and reference voltage for prescribing the value of second output voltage $V_{O2}$, a PWM controller 46 driven by detection signal $V_{TD}$ for producing pulse array signals $V_{PT}$ of duty-ratio controlled based on error signal $V_{E2}$ from second output voltage detector 45, an RS flip flop (RSF/F) 47 which is set by pulse array signal $V_{PT}$ from PWM controller 46 and reset by inverted signal $-V_{TD}$ from inverter 44, and a drive circuit 48 for receiving output signal from RSF/F 47 to apply a secondary drive signal $V_{S2}$ to a gate terminal of output-regulatory MOS-FET 41. Configurations other than the above are substantially similar to prior art resonant switching power source device shown in FIG. 6.

In operation of the resonant switching power source device according to this embodiment, when first main MOS-FET 1 is turned on under the off-condition of second main MOS-FET 2, electric current flows through primary winding $6a$ of second transformer 6 to develop voltage on primary winding $6a$ and thereby induce a positive voltage $V_{T22}$ on secondary winding $6b$ of second transformer 6. Simultaneously, electric current flows through primary winding $5a$ of first transformer 5 to develop voltage on primary winding $6a$, however, as negative voltage is induced on secondary winding $5b$ of first transformer 5, adversely biasing voltage is applied on first output rectifying diode 8 in first rectifying smoother 10 so that first output rectifying diode 8 is kept in the non-conductive condition to prevent electric current $I_{D1}$ from flowing through first output rectifying diode 8. On the other hand, positive voltage $V_{T22}$ induced on secondary winding $6b$ of second transformer 6, is applied on second rectifying smoother 20 and voltage change detector 43 in output control circuit 42 to switch second output rectifying diode 18 into the conductive condition upon turning-on of output-regulatory MOS-FET 41. At this time, voltage change detector 43 produces detection signal $V_{TD}$ of high voltage level to drive PWM controller 46, and at the same time, forwards detection signal $-V_{TD}$ of low voltage level through inverter 44 to reset terminal R of RSF/F 47 which therefore comes to a position shiftable to the set condition. When PWM controller 46 transmits pulse array signal $V_{PT}$ of high voltage level to set terminal 5 of RSF/F 47 which therefore is set, RSF/F 47 produces secondary drive signal $V_{S2}$ of high voltage level through drive circuit 48 to gate terminal of output-regulatory MOS-FET 41 to turn it on. Accordingly, electric current $I_{D2}$ flows from secondary winding 6b of second transformer 6 to second output rectifying diode 18 to electrically charge second output smoothing capacitor 19 and raise second output voltage $V_{O2}$ between second DC output terminals 21 and 22.

When output-regulatory MOS-FET 41 is turned on, voltage $V_{T22}$ on secondary winding 6b of second transformer 6 is clamped at a sum voltage of voltage drop across second output rectifying diode 18 in the forward direction and voltage $V_{O2}$ in second output smoothing capacitor 19. In the circuit shown in FIG. 1 incorporated with second transformer 6 having second leakage inductance 6d, elevated voltage $[(N_2/N_1) \times V_{N1}]$ appears on secondary winding 6b (number of turns: $N_2$) of second transformer 6, turn ratio times $(N_2/N_1)$ of voltage $(V_{N1})$ applied on primary winding 6a (number of turns: $N_1$) of second transformer 6. However, second leakage inductance 6d of second transformer 6 can absorb the potential difference $[(N_2/N_1) \times V_{N1} - (V_{D18} + V_{O2})]$ between elevated voltage $[(N_2/N_1) \times V_{N1}]$ on secondary winding 6b and sum voltage $(V_{D18} + V_{O2})$ of voltage drop $(V_{D18})$ across second output rectifying diode 18 in the forward direction and voltage $V_{O2}$ in second output smoothing capacitor 19. Then, when first main MOS-FET 1 is turned from on to off, negative voltage $V_{T22}$ is excited on secondary winding 6b of second transformer 6 to adversely bias second output rectifying diode 18 with negative voltage $V_{T22}$ so that second output rectifying diode 18 is changed to the non-conductive condition, and electric current $I_{D2}$ through second output rectifying diode 18 becomes substantially zero. At this time, voltage change detector 43 produces detection signal $V_{TD}$ of low voltage level to PWM control circuit 46, and therefore, detection signal $-V_{TD}$ of high voltage level is applied through inverter 44 to reset terminal R of RSF/F 47 which therefore is reset. Thus, RSF/F 47 produces output signal at output terminal Q to supply secondary drive signal $V_{S2}$ of low voltage level through drive circuit 48 to gate terminal of output-regulatory MOS-FET 41 which therefore is turned from on to off.

Subsequently, when second main MOS-FET 2 is turned on under the off-condition of first main MOS-FET 1, positive voltage is induced on secondary winding 5b of first transformer 5 to bias first output rectifying diode 8 in the forward direction and therefore, switch it in the conductive condition. This allows electric current $I_{D1}$ to flow from secondary winding 5b of first transformer 5 through first output rectifying diode 8 into first output smoothing capacitor 9 to electrically charge it, elevating first DC output voltage $V_{O1}$ between first output terminals 11 and 12. After that, when second main MOS-FET 2 is turned off and first main MOS-FET 1 is turned on, positive voltage $V_{T22}$ is induced on secondary winding 6b of second transformer 6, and then, when PWM control circuit 46 produces pulse array signal $V_{TP}$ of high voltage level, output-regulatory MOS-FET 41 is turned from off to on, and electric current $I_{D2}$ flows from secondary winding 6b of second transformer 6 through second output rectifying diode 16 into second output smoothing capacitor 19 to electrically charge it, increasing second DC output voltage $V_{O2}$ between second output terminals 21 and 22.

Second output voltage detector 45 in second output control circuit 42 detects second DC output voltage $V_{O2}$ from second rectifying smoother 20 to produce to PWM control circuit 46 error signal $V_{E2}$, the differential between detected voltage $V_{O2}$ and reference voltage for prescribing second DC output voltage $V_{O2}$. PWM control circuit 46 is driven by detection signal $V_{TD}$ of high voltage level from voltage change detector 43 to control duty-ratio in pulse array signal $V_{PT}$ based on voltage level of error signal $V_{E2}$ from second output voltage detector 45. Specifically, when second DC output voltage $V_{O2}$ from second rectifying smoother 20 is higher than reference voltage, PWM control circuit 46 produces pulse array signal $V_{PT}$ of smaller duty-ratio to set terminal of RSF/F 47 to supply secondary drive signal $V_{S2}$ of narrower pulse width to gate terminal of output-regulatory MOS-FET 41 from output terminal Q of RSF/F 47 through drive circuit 48. This shortens the on-period of output-regulatory MOS-FET 41 to reduce the period for sending charging current to second smoothing capacitor 19 in second rectifying smoother 20, and thereby lower second DC output voltage $V_{O2}$ on second output smoothing capacitor 19. To the contrary, when second DC output voltage $V_{O2}$ from second rectifying smoother 20 is lower than reference voltage, PWM control circuit 46 produces pulse array signal $V_{PT}$ of greater duty-ratio to set terminal of RSF/F 47 to supply secondary drive signal $V_{S2}$ of wider pulse width to gate terminal of output-regulatory MOS-FET 41 from output terminal Q of RSF/F 47 through drive circuit 48. This extends the on-period of output-regulatory MOS-FET 41 to elongate the period for sending charging current to second smoothing capacitor 19, and thereby increase second DC output voltage $V_{O2}$ on second output smoothing capacitor 19. In this way, the power source device can control the on-period of output-regulatory MOS-FET 41 in response to second DC output voltage $V_{O2}$ produced from second rectifying smoother 20 in synchronization with the on-period of first main MOS-FET 1 to take second DC output voltage $V_{O2}$ of generally constant level from second DC output terminals 21 and 22. Basic operations other than the foregoing are omitted because they are essentially similar to those of prior art resonant switching power source device shown in FIG. 6.

Figure 3:
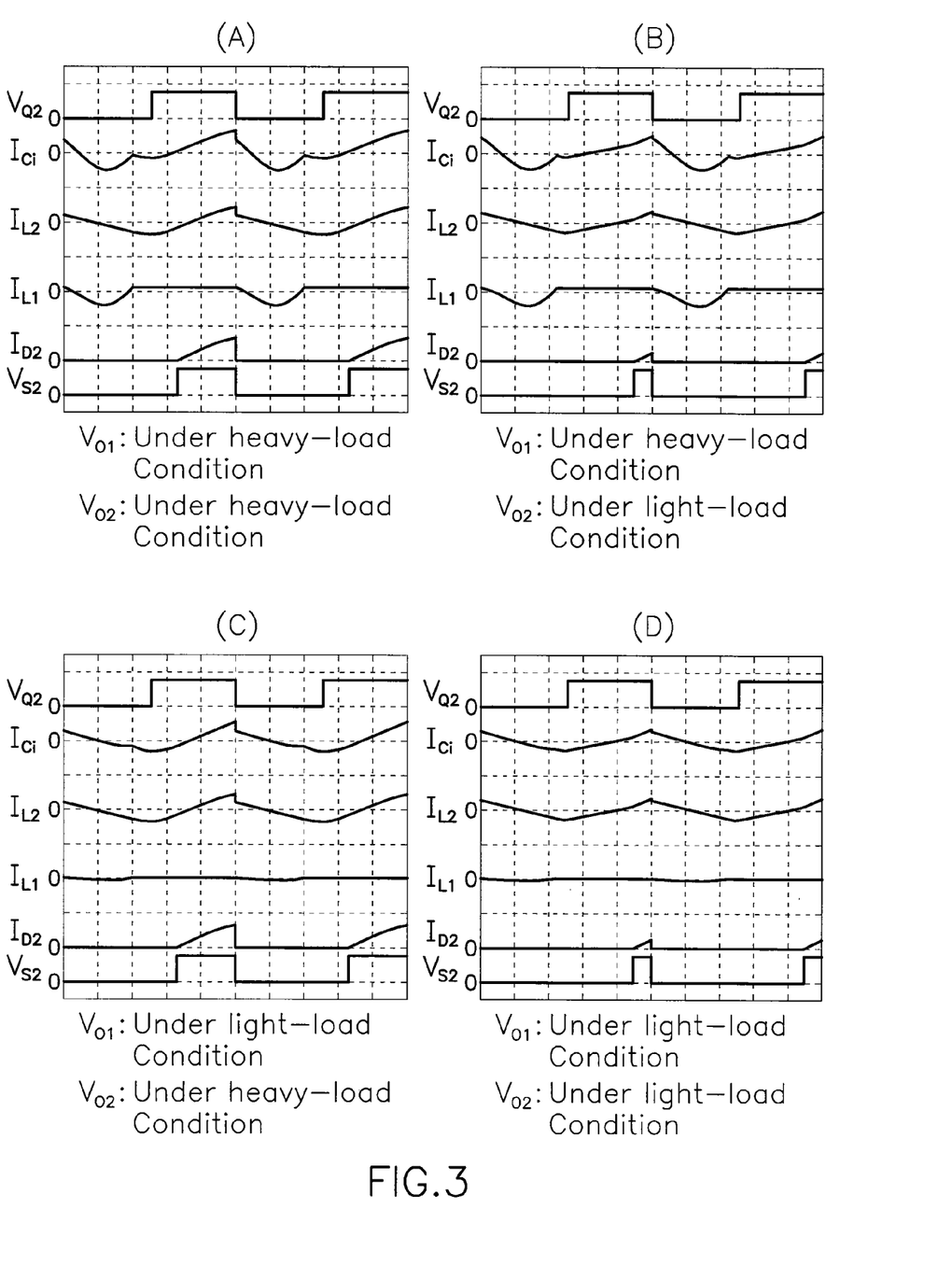
FIG. 3 is wave form charts of voltages and electric currents during operation at selected locations in the electric circuit shown in FIG. 1.
Figure 4:
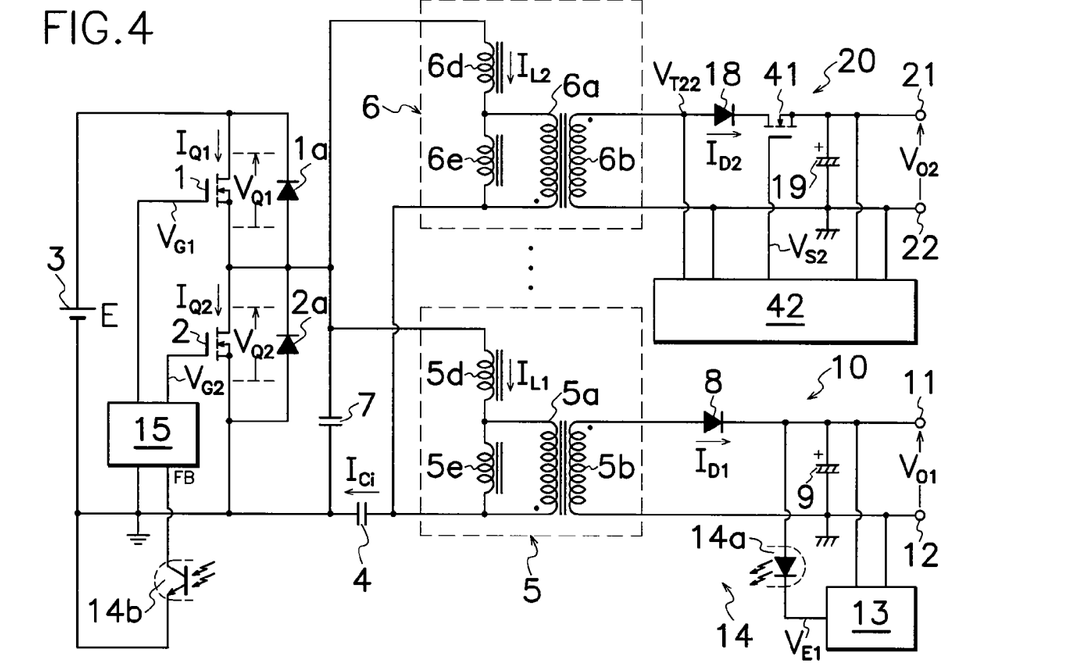
FIG. 4 is an electric circuit diagram showing a second embodiment of the present invention.
Figure 5:
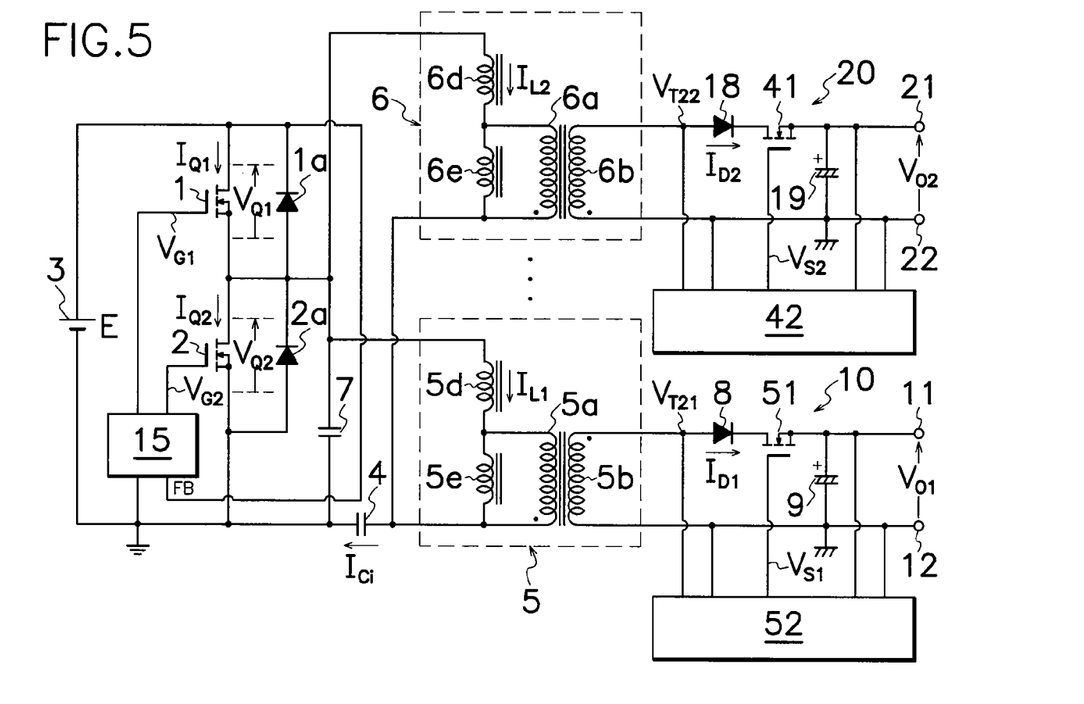
FIG. 5 is an electric circuit diagram showing a third embodiment of the present invention.

FIG. 3 indicates time charts of drain-source voltage $V_{Q2}$ of second main MOS-FET 2, electric current $I_{Ci}$ through current resonance capacitor 4, electric current $I_{L2}$ through second leakage inductance 6d of second transformer 6, electric current $I_{L1}$ through first leakage inductance 5d of first transformer 5, electric current $I_{D2}$ through output-regulatory MOS-FET 41, and secondary drive signal $V_{S2}$ applied to gate terminal of output-regulatory MOS-FET 41. Graph (A) in FIG. 3 indicates both of first and second DC output voltages $V_{O1}$ and $V_{O2}$ under the rated, namely, heavy load condition; graph (B) indicates first DC output voltage $V_{O1}$ under the heavy load condition and second DC output voltage $V_{O2}$ under the light load condition; graph (C) indicates first DC output voltage $V_{O1}$ under the light load condition and second DC output voltage $V_{O2}$ under the heavy load condition; and graph (D) indicates both of first and second DC output voltages $V_{O1}$ and $V_{O2}$ under the light load condition. In this case, excitation inductance 5e of first transformer 5 has a selected larger value than that in FIG. 6 such that almost no or little amount of excitation current flows through first transformer 5 during the on-period of first main MOS-FET 1; leakage inductance 5d of first transformer 5 has a substantially same value as that in FIG. 6; excitation inductance 6e of second transformer 6 has a selected sufficiently small value to produce charging current into current resonance capacitor 4 and to supply output power to all loads connected to first and second DC output terminals 11, 12 and 21, 22; and leakage inductance $6d$ of second transformer 6 has a selected larger value than that of leakage inductance $5d$ of first transformer 5.

When first main MOS-FET 1 is turned on and second main MOS-FET 2 is turned off, sum current $I_{Ci}$ of electric currents $I_{L1}$ and $I_{L2}$ through leakage and excitation inductances $5d$, $6d$ and $5e$, $6e$ in first and second transformers 5 and 6 flows through current resonance capacitor 4, however, a major amount of electric current $I_{Ci}$ for electrically charging current resonance capacitor 4 flows through leakage and excitation inductances $6d$ and $6e$ of second transformer 6, and almost no or very little amount of electric current $I_{Ci}$ flows through leakage and excitation inductances $5d$ and $5e$ of first transformer 5 to restrain power loss associated with excitation current in first transformer 5 since excitation inductance $5e$ of first transformer 5 is larger than excitation inductance $6e$ of second transformer 6. At this time, only during the on-period of secondary output-regulatory MOS-FET 41, second DC output current $I_{D2}$ flows through output-regulatory MOS-FET 41 to produce second DC output voltage $V_{O2}$ based on resonance current due to resonance action by leakage inductance $6d$ of second transformer 6 and current resonance capacitor 4 so that electric power can be supplied to load not shown. If half cycle of resonance by leakage inductance $6d$ of second transformer 6 and current resonance capacitor 4 is set to be longer than the on-period of first main MOS-FET 1, control of second DC output voltage $V_{O2}$ by the on-period of output-regulatory MOS-FET 41 becomes effective throughout a whole on-period of first main MOS-FET 1 to widen the controlled voltage range of second DC output voltage $V_{O2}$. Then, when first main MOS-FET 1 is turned off and second main MOS-FET 2 is turned on, current resonance capacitor 4 is discharged to apply voltage in the adverse direction on each primary winding $6a$, $6a$ of first and second transformer 5 and 6 which are therefore reset to the excitation condition substantially similar to that when first main MOS-FET 1 is turned on. At this moment, energy by resonance current through first leakage inductance $5d$ and current resonance capacitor 4 is transmitted to secondary side to supply electric power to load not shown connected to first DC output terminals 11 and 12.

Under the load condition shown in FIG. 3 (A), when first main MOS-FET 1 is turned on and second main MOS-FET 2 is turned off, electric current $I_{L1}$ does almost not flow through leakage inductance $5d$ of first transformer 5. On the contrary, before output-regulatory MOS-FET 41 is turned on, only excitation current $I_{L2}$ flows through leakage inductance $6d$ of second transformer 6, and after output-regulatory MOS-FET 41 is turned on, electric current $I_{L2}$ of resonance current to be transmitted to secondary side and superimposed on the above excitation current flows through leakage inductance $6d$ of second transformer 6. At the time, sum electric current $I_{Ci}$ of electric currents $I_{L1}$ and $I_{L2}$ through leakage inductances $5d$ and $6d$ of first and second transformers 5 and 6 flows through current resonance capacitor 4 to electrically charge it. Also, when first main MOS-FET 1 is turned off and second main MOS-FET 2 is turned on, sine wave-like resonance current $I_{L1}$ to be transmitted to secondary side flows through leakage inductance $5d$ of first transformer 5, and accumulated energy in second leakage and excitation inductances $6d$ and $6e$ causes electric current $I_{L2}$ to flow through leakage inductance $6d$ of second transformer 6 to discharge current resonance capacitor 4. In this case, discharging currents $I_{L1}$ and $I_{L2}$ also flow from current resonance capacitor 4 through leakage and excitation inductances $5d$, $6d$ and $5e$, $6e$ in transformers 5 and 6, most amount of discharging current from current resonance capacitor 4 flows through leakage and excitation inductances $6d$ and $6e$ of second transformer 6 as a sum of leakage and excitation inductances $6d$ and $6e$ of second transformer 6 is larger than a sum of leakage and excitation inductances $5d$ and $5e$ of first transformer 5.

Under the load condition shown in FIG. 3 (B), the on-period of output-regulatory MOS-FET 41 becomes shorter, and only excitation current in second transformer 6 would form most amount of electric current $I_{L2}$ through leakage inductance $6d$ of second transformer 6 when first main MOS-FET 1 is turned on and second main MOS-FET 2 is turned off.

Under the load condition shown in FIG. 3 (C), when first main MOS-FET 1 is turned on and second main MOS-FET 2 is turned off, almost no amount of electric current $I_{L1}$ flows through leakage inductance $5d$ of first transformer 5. Before output-regulatory MOS-FET 41 is turned on, only excitation current $I_{L2}$ of second transformer 6 flows through leakage inductance $6d$ of second transformer 6, and after output-regulatory MOS-FET 41 is turned on, superimposed current $I_{L2}$ of excitation and resonance currents to be transmitted to secondary side flows through leakage inductance $6d$ of second transformer 6. When first main MOS-FET 1 is turned off and second main MOS-FET 2 is turned on, very slight resonance current $I_{L1}$ to be supplied to secondary side flows through leakage inductance $5d$ of first transformer 5, and energy accumulated in leakage and excitation inductances $6d$ and $6e$ causes electric current $I_{L2}$ to flow through leakage inductance $6d$ of second transformer 6 to discharge current resonance capacitor 4.

Under the load condition shown in FIG. 3 (D), almost no electric current $I_{L1}$ flows through leakage inductance $5d$ of first transformer 5 and the on-period of output-regulatory MOS-FET 41 becomes shorter so that only excitation current in second transformer 6 would form major portion of electric current $I_{L2}$ flowing through leakage inductance $6d$ of second transformer 6 when first main MOS-FET 1 is turned on and second main MOS-FET 2 is turned off. In this case, only electric charge into and discharge from current resonance capacitor 4 are repeated by excitation current $I_{L2}$ flowing through leakage and excitation inductances $6d$ and $6e$ of second transformer 6, and almost no resonance current is transmitted to secondary side.

In this way, even with larger excitation inductance $5e$ of first transformer 5 to prevent major amount of excitation current $I_{L1}$ from flowing through first leakage and excitation inductances $5d$ and $5e$, current resonance capacitor 4 is charged and discharged with excitation current $I_{L2}$ flowing through leakage and excitation inductances $6d$ and $6e$ of second transformer 6 to cause output current $I_{D1}$ and $I_{D2}$ to flow into respective loads not shown upon power transmission to secondary sides of first and second transformers 5 and 6 so that sufficient capacities of first and second DC outputs can be supplied to each load. If excitation inductances $5e$ and $6e$ of transformers 5 and 6 are selected in accordance with a proportion of loads to increase excitation current $I_{L2}$ of transformer 6 with smaller amount of supply power to load, smaller amount of electric current can flow through primary winding $5a$ not only when current resonance capacitor 4 is electrically charged, but also when current resonance capacitor 4 is discharged to transmit electric power to load, and therefore, power transmission efficiency cannot be lowered with a compact transformer of small capacity. Also, the on-period of first main MOS-FET 1 may be adjusted in accordance with the level of first DC output voltage $V_{O1}$, and the on-period of output-regulatory MOS-FET 41 may be adjusted in accordance with the level of second DC output voltage $V_{O2}$ to individually stabilize first and second DC output voltages $V_{O1}$ and $V_{O2}$.

This embodiment requires the coincidental individual connection of primary winding 6a, leakage and excitation inductances 5d and 5e of first transformer 5, primary winding 6a, leakage and excitation inductances 6d and 6e of second transformer 6 in parallel relation to second main MOS-FET 2 and in series relation to current resonance capacitor 4 to divide circulation currents through each primary winding 6a, 6a of transformer 5 and 6 in accordance with the proportion [($L_{r1}$+$L_{p1}$)/($L_{r2}$+$L_{p2}$)] in sum [($L_{r1}$+$L_{p1}$), ($L_{r2}$+$L_{p2}$)] of leakage and excitation inductances 5d, 6d ($L_{r1}$, $L_{r2}$) and 5e, 6e ($L_{p1}$, $L_{p2}$) of transformers 5 and 6. This reduces each effective value of electric current flowing through primary windings 6a and 6a of first and second transformers 5 and 6 for control of heating in each transformer 5, 6 and improvement in power conversion efficiency. Also, each individual leakage inductance 5d and 6d in first and second transformers 5 and 6 allows for independent operation of first and second transformers 5 and 6 to separately send first and second output currents $I_{D1}$ and $I_{D2}$ through secondary windings 5b and 6b of first and second transformers 5 and 6 independently from each other, thereby evading current concentration at either first or second DC output terminals 11, 12 or 21, 22. Accordingly, the power source device cannot only independently produce stable DC output voltages $V_{O1}$ and $V_{O2}$ of desired level from first and second DC output terminals 11, 12 and 21, 22, but also control or restrain peak current flowing through first and second rectifying smoothers 10 and 20 for repression in power conversion loss and improvement in power conversion efficiency. Therefore, the power source device can prevent generation of uneven output voltages from plural output terminals in prior art resonant switching power source device which produces DC output voltages from plural output terminals making common use of a single transformer. Also, since the power source device utilizes first and second leakage inductances 5d and 6d connected equivalently and in series to respectively first and second primary windings 5a and 6a of transformers 5 and 6 as first and second resonance inductance elements connected in series to current resonance capacitor 4 and respective primary windings 5a and 6a of first and second transformers 5 and 6, it may comprise transformers provided with cores and windings in different structures and various sizes. For instance, the embodiment shown in FIG. 1 may comprise ad libitum, optionally, as required or selectively second transformer 6 which has a primary winding 6a and core different in structure and size from those in first transformer 5, since second DC output current $I_{D2}$ flows when first main MOS-FET 1 and output-regulatory MOS-FET 41 are simultaneously turned on, and first DC output current $I_{D1}$ flows when second main MOS-FET 2 is turned on. In addition, if excitation inductance 6e of second transformer 6 has a smaller value than that of excitation inductance 5e of first transformer 5, the power source device may reduce the amount of electric current flowing through first transformer 5 even though resonance current merges into the current flow when second main MOS-FET 2 is turned on, and therefore, it may incorporate first transformer 5 of smaller size. In other words, a ratio of the amount in circulation currents to have to flow through first and second primary windings 5a and 6a can be adjusted by selecting leakage and excitation inductances 5d, 6d and 5e, 6e of appropriate values in transformers 5 and 6 depending on magnitude of loads connected to DC output terminals 11, 12 and 21, 22 for good cost performance of transformers relative to magnitude of loads. In addition, the power source device employs output-regulatory MOS-FET 41 connected between second output rectifying diode 18 and smoothing capacitor 19 in second rectifying smoother 20 to turn output-regulatory MOS-FET 41 on and off in synchronization with the on-period of and at the same frequency of first main MOS-FET 1 so that zero current switching (ZCS) of output-regulatory MOS-FET 41 can be accomplished, while restraining electric current through output-regulatory MOS-FET 41 to reduce switching loss thereof.

The resonant switching power source device shown in FIG. 1 can be modified. By way of example, a resonant switching power source device according to the embodiment shown in FIG. 4 has first and second transformers 5 and 6 whose secondary windings 5b and 6b are of the same polarity. In this case, during the on-period of second main MOS-FET 2, the power source device can concurrently produce first and second DC output voltages $V_{O1}$ and $V_{O2}$ from secondary windings 5b and 6b of first and second transformers 5 and 6 through first and second rectifying smoothers 10 and 20 and DC output terminals 11, 12 and 21, 22. Also, a resonant switching power source device shown in FIG. 5 comprises a main control circuit 15 for controlling the on-off operation of first and second main MOS-FETs 1 and 2 in response to fluctuation in voltage level E of DC power source 3. In this case, as the power source device is subject to almost no change in the period for supplying electric power from primary to secondary side of first and second transformers 5 and 6 even under the fluctuation in loads, main control circuit 15 can control, at a consistent level, voltage on each primary winding 5a, 6a of first and second transformers 5 and 6 by turning first and second main MOS-FETs 1 and 2 on and off depending on fluctuation in voltage level E of DC power source 3. Accordingly, respective output control circuits 52 and 42 may control the on-off operation of output-regulatory MOS-FETs 51 and 41 connected in secondary lines of first and second transformers 5 and 6 in response to each level of DC output voltages $V_{O1}$ and $V_{O2}$ to generate two DC output voltages $V_{O1}$ and $V_{O2}$ of different levels from each other. In addition, secondary DC output circuits may comprise all electric components of same type or kind to cut down kinds of parts, reduce cost for manufacture and improve ease of maintenance and compatibility.

Embodiments of the present invention may further be varied in various way without limitation to the foregoing embodiments. For example, in the foregoing embodiments, output-regulatory MOS-FET 41 is turned from off to on by pulse array signal $V_{PT}$ produced from PWM control circuit 46 with the duty ratio depending on error signal $V_{E2}$ from second output voltage detector 45 in output control circuit 42. Alternatively, output-regulatory MOS-FET 41 may be turned from off to on virtually concurrently upon turning-on of second main MOS-FET 2, and then, output-regulatory MOS-FET 41 may be turned from on to off with pulse array signal $V_{PT}$ from PWM control circuit 46 with the duty ratio depending on error signal $V_{E2}$ from second output voltage detector 45 in output control circuit 42. In addition, the foregoing embodiments refer to output-regulatory MOS-FET 41 connected between second output rectifying diode 18 and second output smoothing capacitor 19 in second rectifying smoother 20, however, instead, output-regulatory MOS-FET 41 may be connected wherever between secondary winding 6b of second transformer 6 and second output smoothing capacitor 19. Also, the above embodiments comprise rectifying smoother 10 or 20 of half-wave rectification involving an output rectifying diode 8 or 18 and an output smoothing capacitor 9 or 19, but, it may comprise rectifying smoother of double-wave or full-wave rectification or combination selected from the group consisting of half-, double- and full-wave rectification. Also, first transformer 5 may have a plurality of secondary windings each which is connected to a related rectifying smoother to produce a plurality of DC output voltages. While the above-said embodiments include first primary windings 5a and 6a of first and second transformers 5 and 6 respectively connected in parallel to second main MOS-FET 2 and in series to current resonance capacitor 4, however, instead, first primary windings 5a and 6a of first and second transformers 5 and 6 may be connected in parallel to first main MOS-FET 1 and in series to current resonance capacitor 4. Moreover, the foregoing embodiments may select a smaller value of excitation inductance 6e in second transformer 6 than that of excitation inductance 5e in first transformer 5, however, unlike this, the same or approximate values may commonly be given to excitation inductances 5e and 6e of first and second transformers 5 and 6, or on the contrary, a greater value may be given to excitation inductance 6e in second transformer 6 than that of excitation inductance 5e in first transformer 5. Furthermore, the power source device may have two or more transformers 6 each of which have a primary winding 6a connected in parallel to primary winding 6a of first transformer 5 and a secondary winding 6b connected to a rectifying smoother 20 and an output-regulatory MOS-FET 41 to take three or more stable DC output voltages.

According to the present invention, circulation current arises due to resonance action by each primary winding of first to $n^{th}$ transformers and first capacitor for resonance when first or second switching element is turned on and off where n is an integer of 2 or more than 2, and circulation current branches into and flows through primary windings of transformers with reduction in effective value of electric current flowing through each primary winding of each transformer and for improvement in power conversion efficiency. Also, respective first to $n^{th}$ transformers individually operate to send output currents through each secondary winding of first to $n^{th}$ transformers independently from each other to prevent current convergence in any one of first to $n^{th}$ output terminals. Thus, the power source device can provide stable and independent DC output voltages of desired level from first to $n^{th}$ output terminals, suppressing peak current flowing through each of first to $n^{th}$ rectifying smoothers for improvement in power conversion efficiency. Accordingly, the power source device can prevent issue of unequal output voltages from plural output terminals in prior art resonant switching power source device which produces DC output voltages from plural output terminals sharing a single transformer. The present invention is preferably applicable to resonant switching power source device capable of producing a plurality of independent DC outputs.

What is claimed is:

1. A resonant switching power source device comprising:
   first and second switching elements connected in series to a DC power source,
   a first transformer which has a first primary winding connected in parallel to said first or second switching element and in series to a first capacitor,
   a first rectifying smoother connected between a secondary winding of said first transformer and first output terminals,
   an additional $n^{th}$ transformer which has a single additional winding or n additional primary windings connected in parallel to first or second switching element and in series to said first capacitor, where the n is an integer equal to or more than 2,
   an $n^{th}$ rectifying smoother connected between an additional secondary winding of said additional $n^{th}$ transformer and $n^{th}$ output terminals, and
   a control circuit for forwarding drive signals to and turning said first and second switching elements on and off.

2. The resonant switching power source device of claim 1, further comprising:
   a first leakage inductance element provided in the primary winding of said first transformer, said first leakage inductance element being connected in series to said first capacitor and primary winding of the first transformer, and
   an $n^{th}$ additional leakage inductance element provided in said $n^{th}$ additional primary winding.

3. The resonant switching power source device of claim 2, wherein inductance in said $n^{th}$ leakage inductance element is larger than that in said first leakage inductance element.

4. The resonant switching power source device of claim 1, further comprising:
   an output-regulatory switching element between said additional secondary winding and additional rectifying smoother in each of said $n^{th}$ transformer,
   wherein said output-regulatory switching element is turned on and off in synchronization with switching frequency of said first or second switching element to produce an $n^{th}$ DC output from said $n^{th}$ output terminals through said $n^{th}$ rectifying smoother.

5. The resonant switching power source device of claim 1, wherein said control circuit controls the on-off operation of said first and second switching elements in response to voltage level on said first output terminals.

6. The resonant switching power source device of claim 1, wherein said control circuit controls the on-off operation of said first and second switching elements in response to fluctuation in voltage level from said DC power source.

* * * * *